Dec. 7, 1943. J. F. RUDE 2,336,152
ARTICULATED AND LIFTABLE TOOTHED HARROW
Filed Feb. 18, 1942 4 Sheets-Sheet 1
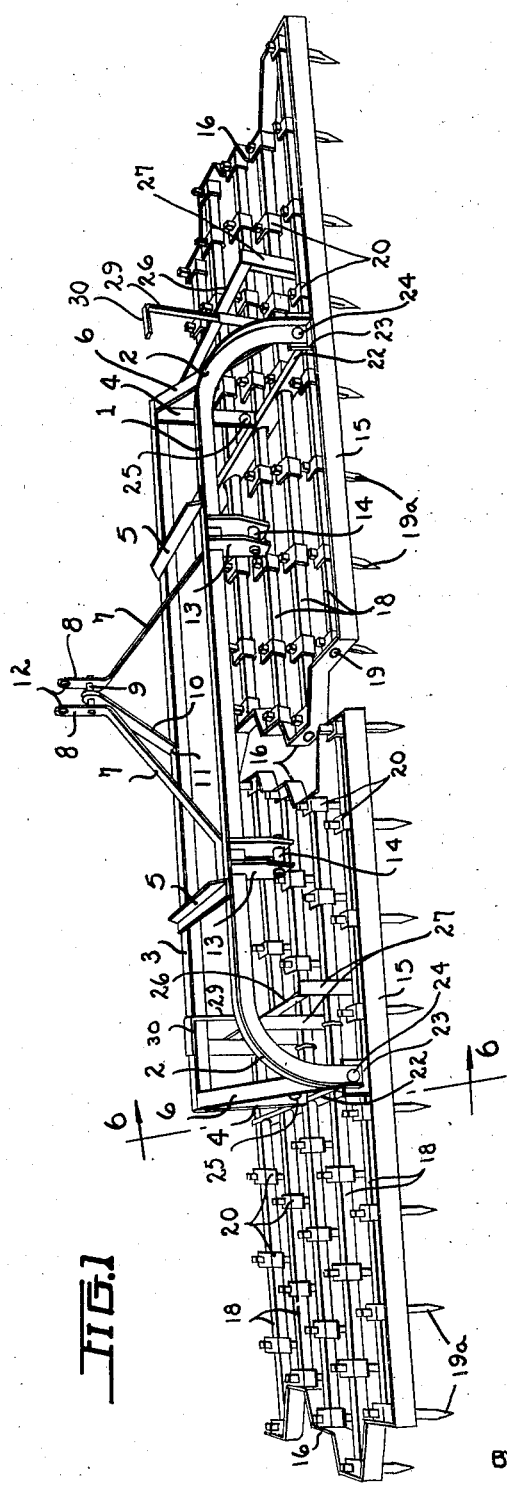
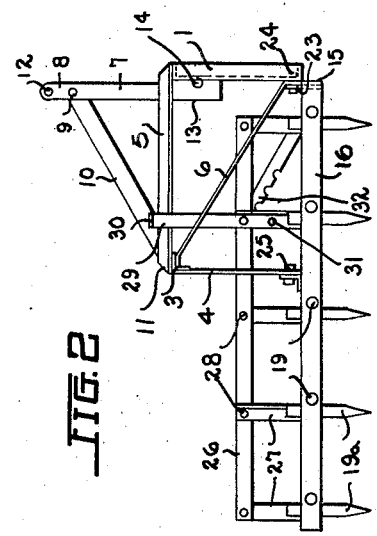
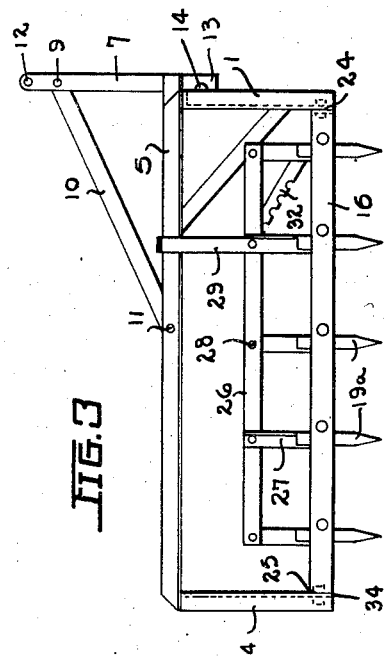
INVENTOR
JOHN F. RUDE
ATTORNEYS Dec. 7, 1943.　　　　　J. F. RUDE　　　　　2,336,152
ARTICULATED AND LIFTABLE TOOTHED HARROW
Filed Feb. 18, 1942　　　4 Sheets-Sheet 2
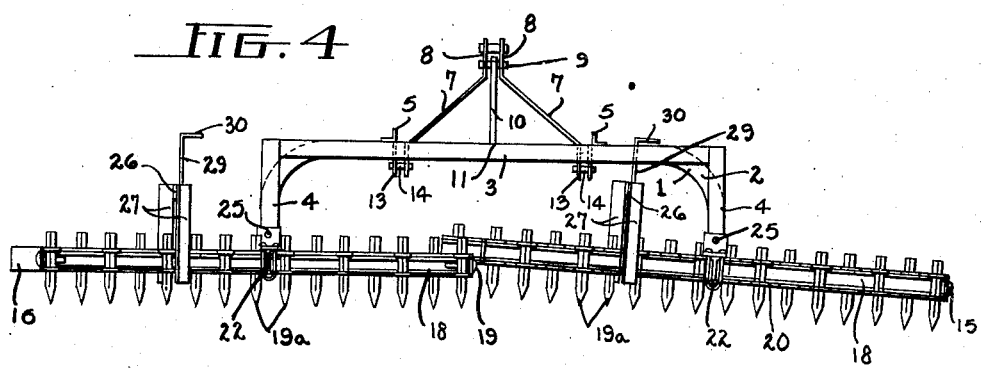
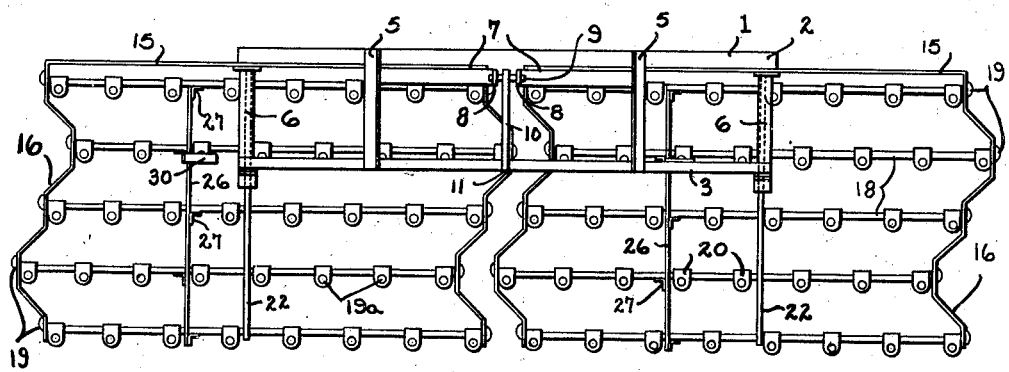
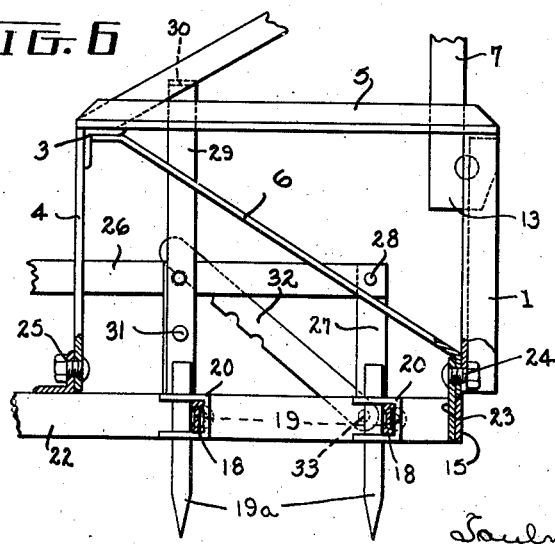
INVENTOR
JOHN F. RUDE
Toulmin & Toulmin
ATTORNEYS

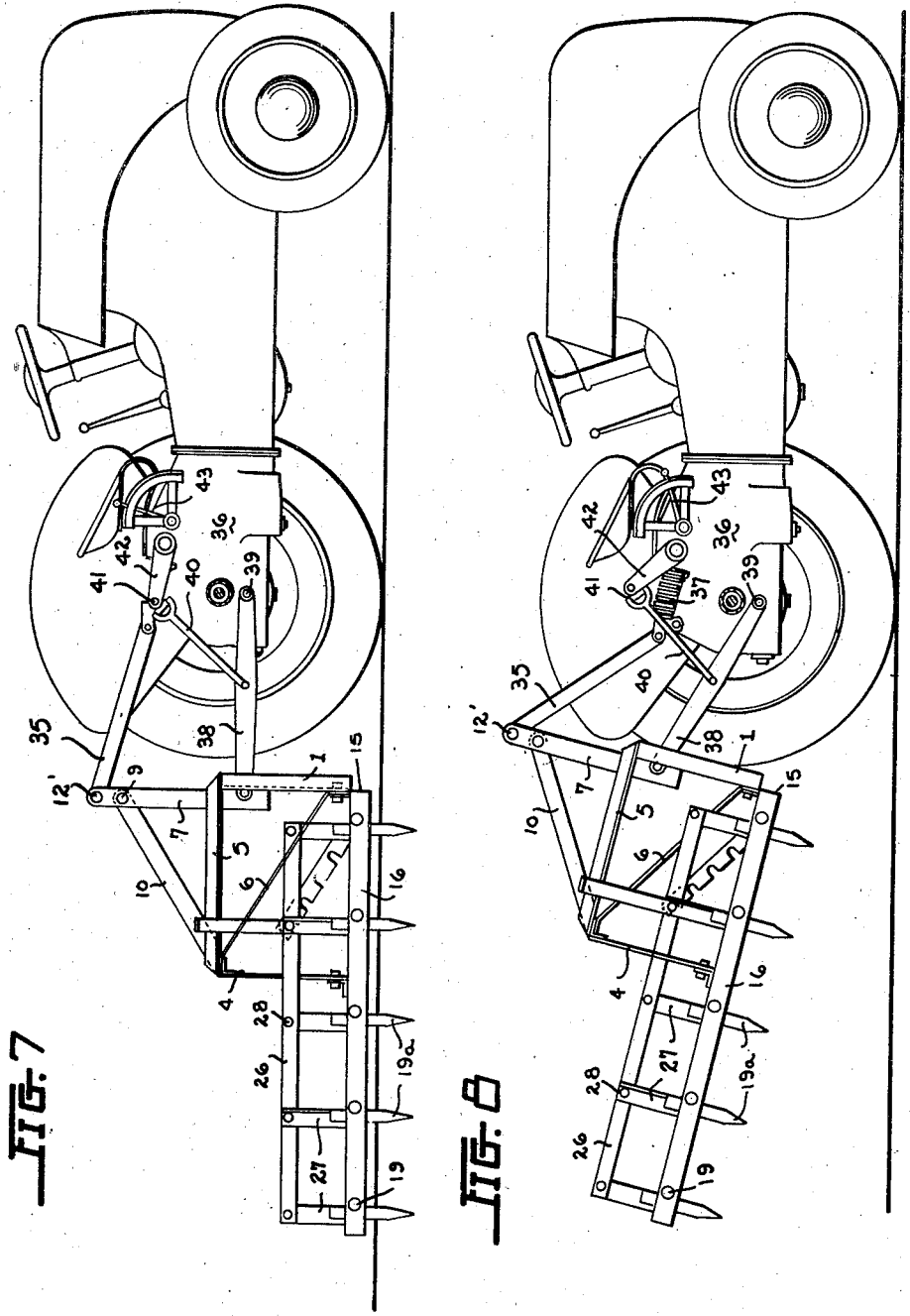

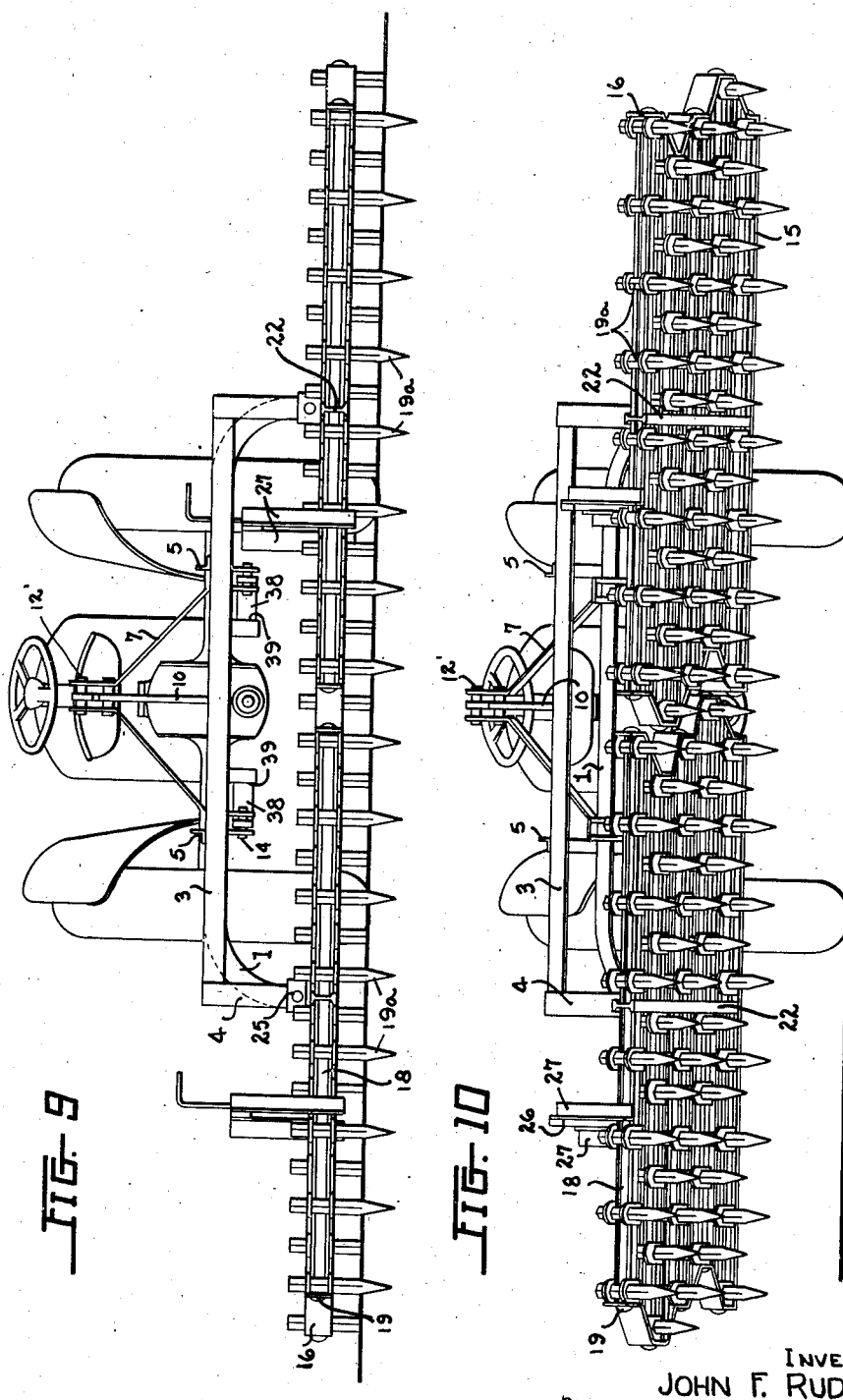
Dec. 7, 1943. J. F. RUDE 2,336,152
ARTICULATED AND LIFTABLE TOOTHED HARROW
Filed Feb. 18, 1942 4 Sheets-Sheet 4
INVENTOR
JOHN F. RUDE
BY *Toulmin & Toulmin*
ATTORNEYS Patented Dec. 7, 1943

2,336,152

UNITED STATES PATENT OFFICE 2,336,152

ARTICULATED AND LIFTABLE TOOTHED HARROW

John F. Rude, Evansville, Ind., assignor to Blount Plow Works, Evansville, Ind., a corporation of Indiana Application February 18, 1942, Serial No. 431,410

13 Claims. (Cl. 55—90)

The present invention relates to farm implements, and more particularly to tractor-drawn spike tooth harrows.

Harrows are employed on the farm mainly to level the ground and to break up clods, rooty soil, etc., and this implement performs these functions by means of gangs of spaced rods or spikes having relatively sharp points and which are adapted to extend into the ground. The spikes are rigidly spaced from one another by means of heavy frames which are drawn over the ground by means of a tractor.

Among the features of the invention is to provide a harrow of the spike tooth type, in which the spikes are carried in frames so articulated that at least the majority of the spikes will enter the soil to the required depth, even when the ground is considerably hilly, bumpy or has other irregularities of contour.

Spike tooth harrows are usually drawn by tractors, and prior to the present invention when it was necessary to lift the harrow from the ground for transportation purposes over the road, the operator would have to leave the tractor and pull up on especially positioned rods or levers, and the harrow was held in its lifted position by a hook. The same laborious operation must also be performed when the harrow is adjusted during operation to obtain the proper depth of insertion of the spikes into the ground. Accordingly, another object of the invention is to provide improved apparatus and method by which the spring tooth harrow may be readily lifted from the ground as far as it will go in order to permit transportation of the harrow over the highways, or to any intermediate position in order to adjust the depth to which the spike teeth are inserted into the ground. The harrow-lifting elements are so arranged, in accordance with the invention, that the driver need not leave his seat but can operate the lifting mechanism by finger-tip control and obtain any height of the harrow which he desires.

Certain types of farm land are of a rooty or sod-like character, forming clods which prevent an even distribution of seed and ready cultivation. When a harrow of the ordinary type is drawn over this kind of land, these clods tend to collect around the individual spikes, which action interferes with the ground-breaking or leveling function of the harrow teeth. It is customary for the operator to stop the tractor and laboriously disengage the clods from the spikes, but this represents additional work which could otherwise have been employed to complete the harrowing operation. A still further object of the invention is to improve the harrow in such a manner that the teeth are precluded, at least for the most part, from forming clods which may originate from rooty soil.

The general object of the invention is to provide an improved harrow which may be lifted bodily for transportation and lowered bodily while in operation, and may be satisfactorily employed on all kinds of plowed fields regardless of the configuration of the terrain and the character of the soil so as to leave the soil in a strictly level state, ready for the planting and cultivating operations.

These objects are attained, in brief, by providing a main frame from which are swivelly supported or suspended two or more auxiliary frames carrying the spike teeth. The main frame is connected to the tractor through a hitch which is hydraulically operated and has tension and compression members so arranged that when pressure fluid is admitted to the power mechanism, the main frame and the supported auxiliary frames are operated upwardly through any desired angle controlled from the operator's seat. In addition, the spikes are arranged in rows on the auxiliary frames, and each row is permitted to swing in the vertical direction so as to give the spikes any desired cant, depending on the direction in which the harrow is being drawn. For this purpose the spikes are all mounted on rotatable carrying members, and mechanism is provided by which the members of each auxiliary frame are caused to rotate or rock in unison.

Other objects and features will be apparent when the following description is perused in connection with the accompanying drawings.

In the drawings:

Figure 1 is a perspective view of the improved harrow looking from the front end to the rear, and showing the harrow detached from the traction means.

Figure 2 is an end elevational view of the harrow.

Figure 3 is a view similar to Figure 2, but showing a modified form of the improved harrow.

Figure 4 is a rear view of the apparatus, but showing one of the harrow sections in a tilted position.

Figure 5 shows a plan view of the harrow.

Figure 6 represents a sectional view taken approximately at the line 6—6 in Figure 1, looking in the direction of the arrows and showing the swivel joints on which the harrow sections are mounted in section.

Figure 7 is a side elevational view of the improved harrow and its tractor, showing the harrow spikes inserted in the ground.

Figure 8 is a view similar to Figure 7, but showing the action of the lifting mechanism by which the harrow elements are withdrawn from the ground and elevated for transportation purposes.

Figure 9 is a rear view of the entire machine, including the harrow and tractor, and showing the harrow in its downward operating position, similar to Figure 7.

Figure 10 is a rear view of the combined harrow and tractor, in which the harrow is lifted in the manner shown in Figure 8.

The harrow is carried on a rigid lift frame, the elements of which together with the harrow constitute a box-like arrangement and the frame as a whole is adapted to be connected to a suitable source of motive power, for example, a tractor. The arrangement is also such that the frame is adapted to be lifted through suitable linkage bars which connect the frame to the differential housing or other convenient surface of the tractor. This frame, in general, is constituted of a U-shaped structural member 1 which spans the two sections of the harrow and has a relatively long rectilinear portion, terminating at each end in a curved portion 2 where it is swivelly connected to each harrow section, as will be explained hereinafter.

Directly opposite the frame member 1, and positioned at the rear of the harrow there is a rectangular frame structure formed of angle irons and constituted of a horizontal member 3 of approximately the same overall length as the structural member 1, and the member 3 is carried on a pair of angle iron uprights 4, the lower ends of which are swivelly secured to the harrow sections, as will also be explained presently. The structural member 3 is braced on the adjacently positioned member 1 by means of angle iron lengths 5 which span the distance between the upper edges of the structural members. In addition there may be provided at each end of the frame a diagonally extending bar 6 which may also conveniently take the form of an angle iron piece. The box frame described immediately above is supported on the tractor through a rigid metal frame, two arms 7 of which extend in a vertical direction, looking at the end of the harrow, and are secured in any suitable manner to the front structural member 1. These arms are angularly disposed with respect to one another, as viewed from the front end of the harrow, and at the top terminate in a pair of spaced parallelly positioned short length portions 8. These portions carry a rod 9 on which is swivelly mounted a third arm 10 of the frame, which is rigidly secured in any suitable manner to the structural member 3, as indicated at 11 in Figure 2. The uppermost ends of the portions 8 are provided with a pair of aligned openings 12 for receiving a rod 12′ which may form part of a spring-mounted linkage for flexibly hitching the metal frame to the tractor at a suitable position. In order to complete the support of the harrow on the tractor, there may be provided two pairs of plates 13 which extend downwardly from the structural member 1, the plates of each pair being spaced from one another and carrying a draw bolt 14 to which a bar may be secured and hitched to another point on the tractor.

This linkage or hitch may comprise a compression bar 35 swivelly connected at one end to the rod 12′, and is pivotally mounted at the other end on the differential housing 36 of the tractor. There is a compression spring 37 connected between the bar 35 and a fixed position on the housing. The purpose of the spring is to take up the shock produced in the linkage when the harrow is moved to its uppermost position. There is a pair of lower or tension bars 38 which are swivelly connected at one end to the draw bolts 14 and at the other end are swivelly mounted on opposite sides of the housing, as indicated at 39. Extending upwardly from an intermediate position on the bars 38 there is a pair of angularly directed rods 40 which terminate at the top in a universal joint 41, from which extends a hydraulically operated lever 42. The lever is connected to a hydraulic motor contained within the housing 36 and is adapted to be rotated when pressure fluid is admitted to the motor by operating a quadrant handle 43. The further down the handle 43 is moved the greater will be the pressure exerted through the hydraulic motor (not shown) on the lever 42, and the greater will be the lifting force exerted on the bars 38.

A comparison of Figures 7 and 8 will show the positions assumed by the compression bar 35 and the tension bars 38 when the power-driven lever 42 is rotated upwardly as the handle 43 is swung downwardly. The arrangement is such that when the handle 43 is moved downwardly the entire box frame, including the harrow elements, is caused to swing through a vertical arc, and when the handle is moved in the opposite direction the box frame is caused to move downwardly so that the positions of the harrow sections as a whole, with respect to the surface of the ground, may be accurately controlled from the driver's seat. It should be noted from Figure 7 that when the harrow elements are caused to enter the ground the compression bar 35 is practically directly in line with the spring 37 in order that the latter may exercise its greatest force in a direction along the bar (compressional force) to maintain the spikes in their proper position with respect to the ground. Under these conditions the bars 38 are actually in tension since they pull on the box frame in such a manner as to cause the frame to swing about its pivot points 12, 14, thus producing a strong push downwardly on the box frame and the harrow sections.

*Harrow elements*

The harrow itself is formed of a plurality of sections, two as illustrated, and each section accommodates a plurality of rows of spikes or teeth and as many spikes within each row as is possible without making the width of the harrow (i. e. as considered along the axis of the tractor) so great that the harrow becomes unwieldy. In the exemplary harrow illustrated, five rows of spikes per harrow section have been shown, with eight spikes per section in each row, thus making forty spikes in all per section. However, it will be understood that the number of spikes or teeth may be varied greatly, depending on the width of the ground area which it is desired to cover during each travel of the harrow, and also depending on the character of the ground. The harrow elements are supported within a pair of relatively large I-beam frames, indicated at 15, which take on a general U-shape, but the ends of each U are given an irregular configuration, as indicated at 16, for practical reasons. The general disposition of the harrow spikes is such that the spikes of one row, across the entire width of the harrow, are diagonally displaced with respect to the spikes of the succeeding row, and inasmuch as the harrow is divided into two separate sections or groups, the purpose of which will also be explained hereinafter, it is necessary that the inner adjacent ends 16 of the frames 15 be given an irregular shape in order to provide the proper spacing between the harrow spikes. The outer ends of each harrow frame conform to the shape of the inner ends, thus also taking on an irregular shape and for purposes which have been pointed out hereinbefore.

The end frame members 16 of each harrow section are spanned by a plurality of equi-distantly spaced I-beams indicated at 18, these beams being parallelly aligned and terminating at their opposite ends in a pair of short rods 19 which are swivelly mounted in openings in the oppositely disposed end frame members 16. The arrangement is such that the I-beams 18 are all adapted to rock on their pins 19, and as will be explained presently, mechanism is provided by which all of the beams in each section are caused simultaneously to swing through the same angle. In order to secure the spikes or teeth 19a to the respective beams 18, U-shaped straps 20 (Figure 6) are secured to the beams, for example by means of rivets 21. These straps are provided with openings in their horizontal lengths which are adapted tightly to receive the spikes. These openings are preferably of a square configuration to conform to the shape of each rectangular spike. The spikes, which may be fabricated of wrought steel, case hardened, are driven through square openings to leave approximately the same length of spike projecting downwardly from the frame members 15, 16 of the harrow.

In order to give the beams 18 support at intermediate positions, there may be provided a beam 22 extending transversely across each harrow section, and positioned approximately midway between the frame ends 16. These beams may be in the form of I-shaped structural members, each provided with spaced openings of sufficient size to permit the I-beams 18 to rotate without friction. In addition to providing a strengthening tie for the longitudinally extending beams 18, each element 22 provides a pair of pivot points about which the harrow sections may rock in the vertical plane. The front end of each beam 22 (Figure 1) may be connected to the front frame member 15 through a short length of angle iron 23 which extends upwardly to a distance to provide a swivel joint 24. This swivel, of which there are two in the case of a two-section harrow, is connected to the end of the structural frame member 1, as can be plainly seen in Figure 1. Each beam 22 also carries a second swivel joint 25 at a position directly under the rear frame member 3, this swivel joint being connected to the lower end of the angle iron upright 4. Thus each section of the harrow is mounted on a pair of aligned swivels 24, 25 so that the section is adapted to rotate or swing in the vertical plane with respect to its upstanding box frame. Moreover, each harrow section can effect this vertical swing without interference from the other section, and the general purpose of this articulated structure is to permit each harrow section independently to conform to the contour of the ground being worked.

It has been pointed out hereinbefore that in the case of the ground being bumpy or hilly, it is entirely possible that if the harrow is of considerable width (as viewed in the direction of the axle of the tractor) one portion of the harrow may be in proper contact with the ground and unless an articulated arrangement were provided between the harrow sections, the other part of the harrow may either not be in contact with the ground at all or else not in sufficient contact. However, by providing a rigid box-like frame from which the harrow sections are swivelly suspended and independently of one another, each section automatically takes a position as would cause that section to conform more closely to the contour of the ground area which is being worked by that particular harrow section.

*Spike-canting mechanism*

As stated in connection with one of the objects of the invention, it may be desirable to give the spikes or teeth of the harrow a particular cant with respect to the vertical plane. Actually in practice, this cant is in such a direction that the lower ends of the spikes form a trailing edge with respect to the direction in which the harrow is being moved over the ground. The amount of cant depends more especially on the nature of the ground, and in general the greater the tendency for the soil to clod, due to any reason whatsoever, the greater will be the cant given the spikes. In order to effect a simultaneous and uniform movement of the spikes throughout each harrow section, the following mechanism may be employed to advantage. At a suitable position on each harrow section, for example to the right of the right-hand end of the box frame, as shown in Figure 1, there may be provided an I-beam or bar 26 extending transversely of the harrow section and supported above the level of the spike-carrying I-beams 18. There is an upright 27 rigidly connected at the lower end to each of the beams 18 by means, for example, of a U-bolt, these uprights terminating at their upper ends in a swivel rod carried by the bar 26. Thus the latter has projecting downwardly therefrom a number of vertically positioned members 27, swiveled at the top, as indicated at 28, but rigidly connected to the I-beams 18 at the bottom so that if the bar 26 were pushed in the horizontal direction all of the I-beams 18 would be caused to rock through a predetermined angle depending on the distance that the bar 26 is moved.

In order to effect this transverse movement of the bar 26 a lever 29, secured to any one of the uprights 27, may be provided, this lever having a crook 30 to facilitate operation. As shown in Figure 6, the lowermost end of the lever may be riveted to one of the uprights 27, as indicated at 31. A notched restraining bar 32 may be swivelly mounted, as indicated at 33, on one of the I-beams 18, this bar extending diagonally (see Figure 6) and adapted to engage within one of its notches an extension of one of the swivel pins 28. Thus as the bar 26 is moved in the horizontal direction by operating the lever 29, the final position of the bar is determined by the notched restraining bar 32 in order that the cant given the spikes of the harrow section shall be rigidly maintained. As the bar 26 is moved farther to the left (as seen in Figure 6) the outermost notches on the restraining bar 32 are caused to engage the swivel extension 28. As shown in Figure 1, each harrow section is provided with its own spike-canting mechanism because one harrow section may be working soil of a different character than the other harrow section, and for that reason may require a different adjustment of the angle between the spikes of a given section and the ground.

From the foregoing it is evident that I have disclosed an improved harrow formed of a plurality of sections, separate from one another and suspended from a box frame in such a manner that each harrow section is adapted to swing at the pivots 24, 25 and thus to accommodate the harrow spikes to the contour of the ground, and in addition the spikes of each harrow section are adapted to be rotated through any predetermined angle in order to control the cant of the spikes. Moreover, the box frame, which is composed essentially of the parts 1, 3, the frame elements 7, 10 and the swivel bars 14 all form a simple but rigid framework for securing the harrow sections to a tractor or other suitable source of motive power. The arrangement is such that the operator of the tractor, through a suitably positioned lever, may cause all of the spikes of each harrow section to be lifted from the ground, when for example the harrow is being moved at the end of the field toward the next adjacent row to be worked or along the highway. This framework serves as a convenient structure by which the operator can lower the harrow elements into the ground and thus determine exactly the depth to which the soil is to be worked by the spikes.

It has been pointed out hereinbefore that the I-beam frame members 15, 16 extend only around three sides of each harrow section, and it has been found that the three-sided frame gives sufficient support to the spike elements of each harrow section. However, if desired the frame may be continued around all sides of each section, and this modification is shown in Figure 3. Thus a structural member similar to the element 15, which in Figure 1 is shown as extending only over the front end of each harrow section, may be provided along the rear end of each section. This additional frame member is indicated at 34 in Figure 3. In this modification the angle iron upright 4 may be secured to the rear frame member 34 instead of being supported at a position intermediate the depth of the harrow section and secured specifically to one of the I-beams 18. In the modification the swivel 25 of each section will therefore be positioned at the rear end of the section instead of at an intermediate point, as illustrated in Figure 1. Otherwise, the modification shown in Figure 3 is similar to that described in connection with the remaining figures, and for that reason the corresponding elements bear similar reference numerals.

It will be understood that I desire to comprehend within my invention such modifications as come within the scope of the claims and the invention.

Having thus fully described my invention, what I claim as new and desire to secure by Letters Patent is:

1. An improved spike tooth harrow comprising a box frame which is adapted to be pivotally carried on a traction device, said harrow being formed of a plurality of sections which are pivotally mounted on said frame to permit a swinging motion of each of said sections in the vertical plane along axes parallel to the longitudinal direction of the draft, said frame being secured to said harrow sections in such a manner that the sections are lifted as a whole with respect to said traction device but are independently swingable on said box frame, and spike tooth harrow elements secured to each of said sections.

2. A spike tooth harrow comprising a main frame adapted to be drawn by a source of motive power, said harrow being formed of a plurality of sections which are pivotally mounted on said frame to permit a swinging motion of each of said sections in the vertical plane along axes parallel to the longitudinal direction of the draft, said frame being secured to said harrow sections in such a manner that the sections are liftable as a whole with respect to said source of motive power but are independently swingable on said frame.

3. A spike tooth harrow comprising a main frame adapted to be drawn by a source of motive power, a plurality of auxiliary frames swivelly mounted on said main frame on swivels which extend in directions parallel to the longitudinal axis of the harrow, spike tooth harrow elements secured to each of said auxiliary frames, and means for lifting said main frame with respect to said source of motive power.

4. A spike tooth harrow comprising a main frame adapted to be drawn by a source of motive power, a plurality of auxiliary frames swivelly mounted on said main frame, spike tooth harrow elements secured to each of said auxiliary frames, and means for lifting said main frame with respect to said source of motive power, said main frame comprising front and rear structural members connected together to form a box, a pair of vertical arms connected at spaced positions to the front structural member, a third arm connected between the rear structural member and the pair of vertical arms, pivots provided at the opposite ends of said vertical arms, a tension bar connecting the upper pivot with a swivel positioned on said source of motive power, a pair of tension bars connected between the lower pivot on said vertical arms and a pivot position on said source of motive power, and means for lifting the tension bars in order to elevate the main frame from the ground and thus simultaneously to lift the auxiliary frames and the spike tooth harrow elements.

5. In combination, a spike tooth harrow comprising a main frame hitched to a tractor which contains a source of pressure fluid, a plurality of auxiliary frames swivelly mounted on said main frame, spike tooth harrow elements secured to each of said auxiliary frames, and means positioned at said hitch for lifting the main frame with respect to the tractor, said main frame having front and rear structural members, a pair of vertical arms secured at the lower ends at spaced positions on the front structural member, a diagonally extending arm secured to the rear structural member and connected to the vertical arms, a compression bar swivelly connected at one end to the upper ends of said vertical arms and at the other end swivelly connected to the differential housing on said tractor, a plurality of tension bars swivelly connected at one of their ends to the lower ends of said vertical arms and at the other ends swivelly connected to the differential housing of the tractor, and means including a hydraulic motor supplied with pressure fluid from the tractor for lifting the tension bars in order to elevate the main frame, also the auxiliary frames and the spike tooth harrow elements from the ground.

6. In an earth-leveling harrow which is adapted to be drawn over the ground by a traction device, said harrow being formed of a main frame and a plurality of sections pivotally mounted on said frame to permit a swinging motion of each of said sections in a vertical plane along axes parallel to the longitudinal direction of the draft, each of said sections being provided with spikes, and means positioned near the traction device for simultaneously controlling the relative positions of the spikes of each harrow section with respect to the ground.

7. An improved harrow comprising a box frame which is adapted to be pivotally carried on a traction device, said harrow being formed of a plurality of sections which are pivotally mounted on said frame to permit a swinging motion of each of said sections in the vertical plane along axes parallel to the longitudinal direction of the draft, said frame being secured to said harrow sections in such a manner that the sections are liftable as a whole about the pivot of the traction device but are independently swingable on said box frame.

8. An improved harrow comprising a framework adapted to be drawn by a source of motive power and swingably mounted with respect thereto, said harrow being formed of a plurality of sections, each being provided with a number of spikes, the ends of said framework being pivotally secured to each of said harrow sections at positions which extend longitudinally of the harrow whereby each harrow section is adapted to swing independently of the other section in a direction transverse of the harrow and whereby the framework is adapted to pull the harrow sections as a whole in a direction longitudinal of the harrow when the framework is connected to a source of motive power, and means positioned at the source of motive power for swingably lifting all of said sections as a whole about the pivot structure on said source of power.

9. A harrow comprising a plurality of sections, each section being contained within a frame formed of two end portions and an interconnecting longitudinal portion, a plurality of spaced bars spanning said portions and swivelly connected within said portions, said bars being provided with a plurality of harrow spikes, means for rocking said bars simultaneously through the same angle in order to give said spikes a uniform cant, and a box frame for connecting said harrow sections to a source of motive power, said harrow sections being swivelly mounted on said box frame in order to permit each section independently to rock with respect to said frame.

10. A harrow comprising a plurality of harrow sections, each being provided with a plurality of spikes, the spikes of each section being supported within a frame on bars which are carried by the end members of said frame, said bars being swivelly mounted in each frame, means for rotating said bars with respect to said frame in order to give said spikes a predetermined cant, a box frame for supporting the harrow sections from a source of motive power, said sections being swivelly mounted on said box frame in such a manner that as the frame is moved in the vertical direction the harrow sections will simultaneously move in the same direction but each harrow section is permitted to move about an independent axis on the box frame in a direction different from the direction in which the harrow sections move as a unit.

11. A harrow comprising two physically separate sections, each of which includes a plurality of harrow spikes, a frame for holding said sections in position and a hitch connecting said frame to a source of motive power, said hitch including a plurality of swivel joints by which the frame can be tilted and the harrow sections raised to a predetermined position, said frame also being provided at each end with a plurality of swivel joints to which the harrow sections are respectively connected whereby each of said sections is adapted to tilt independently of one another in a direction which is different from the direction in which the sections tilt as a unit through the actuation of said hitch.

12. An improved spike tooth harrow comprising a box frame which is adapted to be pivotally carried on a traction device, said harrow being formed of a plurality of sections which are pivotally mounted on said frame to permit a swinging motion of each of said sections in the vertical plane along axes parallel to the longitudinal direction of the draft, said frame being secured to said harrow sections in such a manner that the sections are liftable as a whole with respect to the traction device but are independently swingable on said box frame, bars rotatably mounted on each of said sections, spike tooth harrow elements rigidly secured to said bars, and means for rotating the bars of each section simultaneously in order to turn the spike tooth harrow elements and to control their vertical position with respect to the ground.

13. In combination, a tractor and a spike tooth harrow comprising a rigid main frame and a plurality of auxiliary frames articulately secured to said main frame, spike tooth elements mounted on said auxiliary frames, connecting rods secured at one end to a fixed part on the tractor and swivelly secured at the other end to said main frame, and means for elevating said connecting rods in order to lift the harrow and its articulated auxiliary frames as a unit from the ground, at least one of said rods being positioned to take the compressional stress and another one of said rods being positioned to take the tensional stress so that the elevating movement of the main frame takes place about the ends of the connecting rods which are secured to the tractor.

JOHN F. RUDE.